United States Patent
Vanscoyk et al.

(10) Patent No.: US 9,942,191 B2
(45) Date of Patent: *Apr. 10, 2018

(54) UNIVERSAL SOCIAL MESSAGING

(71) Applicant: AT&T Intellectual Property I, L.P., Atlanta, GA (US)

(72) Inventors: Evan Vanscoyk, Troy, IL (US); James Gordon Beattie, Jr., Bergenfield, NJ (US); Paul Gausman, Bridgewater, NJ (US); Melanie Wilkerson, Greensboro, NC (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/227,676

(22) Filed: Aug. 3, 2016

(65) Prior Publication Data

US 2016/0344680 A1    Nov. 24, 2016

Related U.S. Application Data

(63) Continuation of application No. 13/653,106, filed on Oct. 16, 2012, now Pat. No. 9,436,966.

(51) Int. Cl.
| | |
|---|---|
| *H04L 12/58* | (2006.01) |
| *H04L 29/08* | (2006.01) |
| *G06Q 50/00* | (2012.01) |
| *G06Q 10/10* | (2012.01) |

(52) U.S. Cl.
CPC ............ *H04L 51/36* (2013.01); *G06Q 50/01* (2013.01); *H04L 51/32* (2013.01); *H04L 67/306* (2013.01); *G06Q 10/10* (2013.01)

(58) Field of Classification Search
CPC ....... H04L 51/36; H04L 51/32; H04L 67/306; G06Q 50/01; G06Q 10/10
See application file for complete search history.

(56) References Cited

U.S. PATENT DOCUMENTS

| | | |
|---|---|---|
| 9,014,343 B1 | 4/2015 | Peden et al. |
| 2007/0067810 A1 | 3/2007 | Durden et al. |
| 2008/0307454 A1 | 12/2008 | Ahanger et al. |
| 2009/0034696 A1 | 2/2009 | Ramanathan |
| 2010/0162342 A1 | 6/2010 | Piepenbrink et al. |
| 2011/0145279 A1* | 6/2011 | Chunilal ........... G06F 17/30867 707/769 |
| 2011/0211813 A1 | 9/2011 | Marks |
| 2011/0238755 A1 | 9/2011 | Khan et al. |
| 2012/0198042 A1 | 8/2012 | Dunbar et al. |
| 2012/0317115 A1 | 12/2012 | Naito et al. |
| 2013/0060661 A1 | 3/2013 | Block et al. |
| 2013/0346247 A1 | 12/2013 | Bash et al. |
| 2014/0229270 A1 | 8/2014 | Rashwan |
| 2014/0329515 A1* | 11/2014 | Bluvband ............. H04L 51/066 455/418 |

* cited by examiner

*Primary Examiner* — Brian J Gillis
*Assistant Examiner* — Amy Ling
(74) *Attorney, Agent, or Firm* — Chiesa Shahinian & Giantomasi PC (57) ABSTRACT

A method and system for universal social messaging is disclosed where an event is detecting on a host device by the electronic social messaging platform, an option associated with the event is selected by the electronic social messaging platform, and the option associated with the event is provided to the user of the host device by the electronic social messaging platform.

20 Claims, 7 Drawing Sheets

| Text | Multimedia<br>• Picture<br>• Screenshot<br>• Video | Voice |
|---|---|---|
| Location-Based (broadcast, beacon) using "geofences" (radius) | Check-In | Directions |
| File (Document) | Link | Online Article |
| Activity Alert<br>• I'm watching ____<br>• I'm listening to ____<br>• I'm reading ____<br>• I'm at ____<br>• I'm playing ____ | Recommendation<br>• Listen to ____ song<br>• Watch this ____ video or movie<br>• Try out this ____ app | Invite to<br>• chat<br>• video chat<br>• activity<br>• where you are (current location)<br>• meet somewhere (place on map) |

| Text | Multimedia<br>• Picture<br>• Screenshot<br>• Video | Voice |
|---|---|---|
| Location-Based (broadcast, beacon) using "geofences" (radius) | Check-In | Directions |
| File (Document) | Link | Online Article |
| Activity Alert<br>• I'm watching ______<br>• I'm listening to ______<br>• I'm reading ______<br>• I'm at ______<br>• I'm playing ______ | Recommendation<br>• Listen to ______ song<br>• Watch this ______ video or movie<br>• Try out this ______ app | Invite to<br>• chat<br>• video chat<br>• activity<br>• where you are (current location)<br>• meet somewhere (place on map) |

FIG. 4A

| Post to Facebook | Tweet on Twitter | Share on Google+ |
|---|---|---|
| Check In to Foursquare | Pin to Pinterest | Post on Instagram |

FIG. 4B

| Contacts/AT&T Address Book | Contact Groups |
|---|---|
| Facebook Groups | Facebook Friends |
| Google+ Circles | Twitter Followers |
| Public (a special option that publishes for the entire web) | New Custom Groups |

Messages from the service would collate into different feeds within an application:

- What's happening now
- What's trending
- What are my friends doing (now and in the future)
- What are my friends saying
- What are my friends sharing
- Where are my friends (check-ins)
- What's nearby (location based)
- What have I been invited to (Invitations)
- What has been recommended (Recommendations)

UNIVERSAL SOCIAL MESSAGING

This application is a continuation of prior U.S. patent application Ser. No. 13/653,106 filed Oct. 16, 2012, the disclosure of which is herein incorporated by reference in its entirety.

BACKGROUND

As our daily activities become ever more reliant on support or enhancement via applications or other software tools, such as mobile applications/services, a growing problem facing a typical end user of an electronic device is that of the ability to efficiently access cross-application updates and events. Another challenge is to effectively monitor and navigate to and through the multiple services to which an end user is subscribed to use the desired feature or to access a given update or event.

Further complexity is introduced as messages or events are generated in multiple different formats and transmitted over multiple communications channels (email, status updates, feeds, news feeds, Short Message Service (SMS), Instant Messaging (IM), and social networks (e.g., "tweets", Facebook® generated messages, etc.)) across multiple applications. Thus, the messages intended for a user may need to be accessed by using and therefore launching several different applications, with each application generating notifications, status indications, etc. The overall situation is one of complexity and impacts usability, with multiple events spread across different applications and various communication channels.

SUMMARY

In one embodiment, a user of a host device is registered with a plurality of electronic services, an event is detected on a host device by the electronic social messaging platform, an option associated with the event is selected by the electronic social messaging platform, and the option associated with the event is provided to the user of the host device by the electronic social messaging platform, wherein the plurality of electronic services comprises: social networking portals; messaging utility applications; electronic data storage utilities; and electronic data sharing utilities, wherein registering the user comprises: establishing a signal connection with each of the plurality of electronic services accessed by the host device; creating a user profile for the user of the host device for each of the plurality of electronic services; and providing a plurality of settings associated with each of the plurality of electronic services, wherein the plurality of settings comprise: timing settings, privacy settings, data recall settings, data routing settings, data-type settings, data hierarchy settings, language settings, scheduling settings, and data security settings, wherein detecting an event comprises at least one of: detecting receipt of a text file from an electronic service; detecting receipt of a audio file from an electronic service; detecting a physical movement of the host device resulting from a physical gesture of a user; detecting receipt of a video file from an electronic service; and detecting accessing of a file on the host device, and wherein selecting an option comprises at least one of: reproducing a plurality of options provided by the plurality of electronic services; retrieving an option associated with the event from memory and appending retrieved option to a plurality of options provided by the plurality of electronic services; and retrieving an option associated with the event from memory and embedding retrieved option within a plurality of options provided by the plurality of electronic services.

DETAILED DESCRIPTION

A method and system provide for universal social messaging where an event is detecting on a host device by the electronic social messaging platform, an option associated with the event is selected by the electronic social messaging platform, and the option associated with the event is provided to the user of the host device by the electronic social messaging platform. Functions and techniques performed by the Universal Social Messaging Platform (USMP) for unified cross-application event management are described in detail with further references to the examples of FIGS. 1-5.

Figure 1:
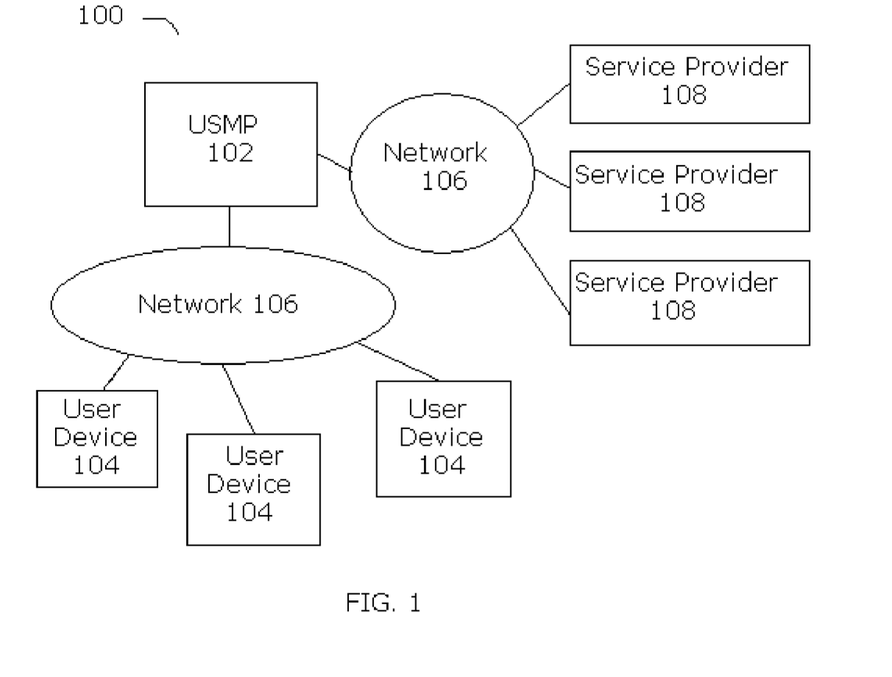
FIG. 1 illustrates an exemplary system for universal messaging, in accordance with an embodiment.

FIG. 1 illustrates an exemplary system for universal social messaging. System 100 includes a Universal Social Messaging Platform (USMP) 102 configured and operable to communicate with a plurality of user devices 104 and with a plurality of service providers 108 via at least one communication network 106.

The USMP 102 is an extended personalized social media platform that may encompass users' channels of interest and harmonize, secure, and streamline access to others and to a wide variety of services. As a unifying platform, it allows users to access the same social outlet/channels from any end point as long as these social outlets/channels are connected to the platform. Users can define and customize their own set of groups and communities with contacts from different social outlets (for example a group may comprise a follower from Twitter®, a friend from Facebook®, and a Google+® contact).

According to an embodiment, the USMP 102 may be any system, device, hardware, middleware, and/or software, and/or any combination thereof that is able to establish a connection with or be integrated with other devices and services, such as user devices 104 and service providers 108. In one embodiment, the USMP 102 may be coupled with user devices 104 via at least one communication network 106. In another embodiment, the USMP 102 may be integrated in user devices 104 as a utility service running on a background. In yet another embodiment, the USMP 102 may be directly connected to user devices 104. It is to be understood that the USMP 102 may be communicating with or accessed by user devices 104 and by service providers 108 in the cloud. In addition, the USMP 102 may be configured to be available to user devices 104 on demand, for example, based either on local processes occurring on user devices 104 or based on processes driven by applications or services provided by service providers 108.

According to an embodiment, user devices 104 can be any system and/or device, and/or any combination of devices/systems that is able to establish a connection with another device, a server and/or other systems such as the USMP 102 and/or service providers 108. It is to be understood that user devices 104 can include mobile or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a Personal Digital Assistant (PDA), a handheld tablet (e.g., an iPad®), a handheld console, a handheld gaming device or console, and/or any other portable, mobile, handheld devices, etc.

According to an embodiment, service providers 108 may provide applications, content, and services that include those used to read and generate emails, instant messages, SMS, or other forms of messages. The messaging applications and communications services may also include social network-based applications such as Facebook®, Twitter®, Flickr®, Gtalk®, LinkedIn®, Skype®, or the like. Thus, the disclosed USMP 102 may provide a more efficient interface to enable a user to interact with multiple applications and communication channels.

According to an embodiment, at least one communication network 106, over which the user devices 104 and the USMP 102 communicate, may be a cellular network, a telephonic network, an open network, such as the Internet, or a private network, such as an intranet and/or the extranet, a secure communications protocol, such as secure sockets layer (SSL), or transport layer security (TLS), or any combination thereof. For example, the Internet can provide file transfer, remote log in, email, news, RSS, cloud-based services, and other services through any known or convenient protocol, such as, but is not limited to, the TCP/IP protocol, Open System Interconnections (OSI), File Transfer Protocol (FTP), Universal Plug and Play (UPnP), Internet Small Computer System Interface (iSCSI), Network Specific Facilities (NSF), Integrated Services Digital Network (ISDN), Plesiochronous Digital Hierarchy (PDH), RS-232 port, Synchronous Digital Hierarchy (SDH), Synchronous Optical NETwork (SONET), etc. The communication network 106 can be any collection of distinct networks operating wholly or partially in conjunction to provide connectivity to the user devices 104 and to the USMP 102 and may appear as one or more networks to the service providers 108.

Communications also can be achieved via one or more of Worldwide Interoperability for Microwave Access (Wi-MAX), a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

According to an embodiment, content may be transmitted from the sender to the receiver by way of a network and a cloud database that processes the information and determines the proper routing, recipients, and directional guidelines from the graphical user interface. This method allows content to flow from peer to peer while being temporarily cached at a centralized location with the USMP 102 providing content. The USMP 102 may employ several known and proprietary routing algorithms to ensure that the content is transmitted to the desired/intended audience.

According to an embodiment, in order to enable user device 104 for USMP functionality, user device 104 has to register with the USMP 102. During registration the user may need to provide personal information to obtain unique user identifiers to be used to connect to the USMP 102 or to download the USMP 102 to be run on one or more user devices 104.

It is to be understood that registration process may include a number of steps, such as creating, storing and maintaining a user profile by obtaining user's data, interests, hobbies, access to service providers with whom the user already has membership privileges, downloading user's contacts/address book information, allowing the user to create hybrid contact lists comprising acquaintances made through various services. For example, the hybrid contact list may include user's immediate family members, user's co-workers, and user's friends, where user's immediate family members' contact information may be reached via user's contacts' list stored on the user device 104, user's co-workers may be reached by InMail® in LinkedIn®, and user's friends may be reached via their contact info on Facebook®.

As may be appreciated, one or more options (e.g., contact lists) may be generated and arranged in a certain order by the USMP 102 based on the user's customary actions. Such actions may include frequent access of certain contacts, frequent use of certain service providers 108, or frequent/particular use of certain functionalities of the user device 104. For example, during registration or at any time thereafter, the USMP 102 may offer the user a suggested contact list for one or more occasions. One example is that the USMP 102 may offer the user a list of people to whom the user sends pictures more frequently than others.

One skilled in the art will recognize that the system configuration of FIG. 1 is non-limiting and that components of the presented system may be combined in any way in various embodiments and may include any additional and/or desired components and/or configurations.

Figure 2:
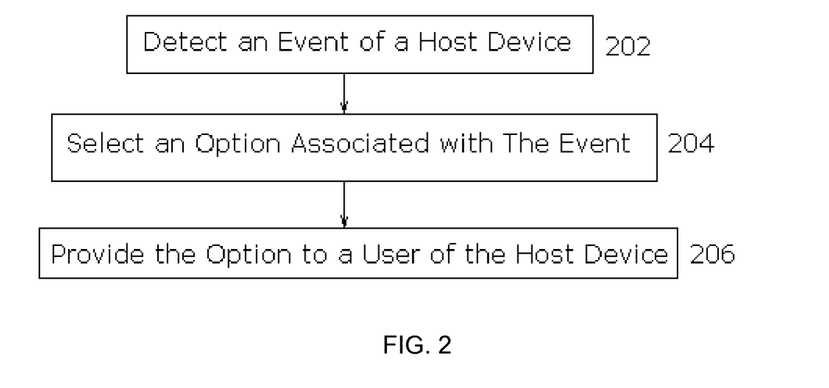
FIG. 2 illustrates an exemplary method for universal messaging, in accordance with an embodiment.

FIG. 2 illustrates a method of using USMP for universal social messaging. At step 202, an event on a user device 104 is detected by the USMP 102. For example, the event detected on the user device 104 may be receipt of or access to a voicemail, email, a short messaging service (e.g., SMS), chat (e.g., internet relay chat), instant messaging (IM), fixed length text messages viewable by a set of subscribers (e.g., "Twitter®"), personal status updates viewable by a set of authorized subscribers (e.g., "Facebook®"), contacts/address book, any suitable media format including plain text, formatted text, rich text, graphics, images, audio, video, animations and simulations.

Figure 3:
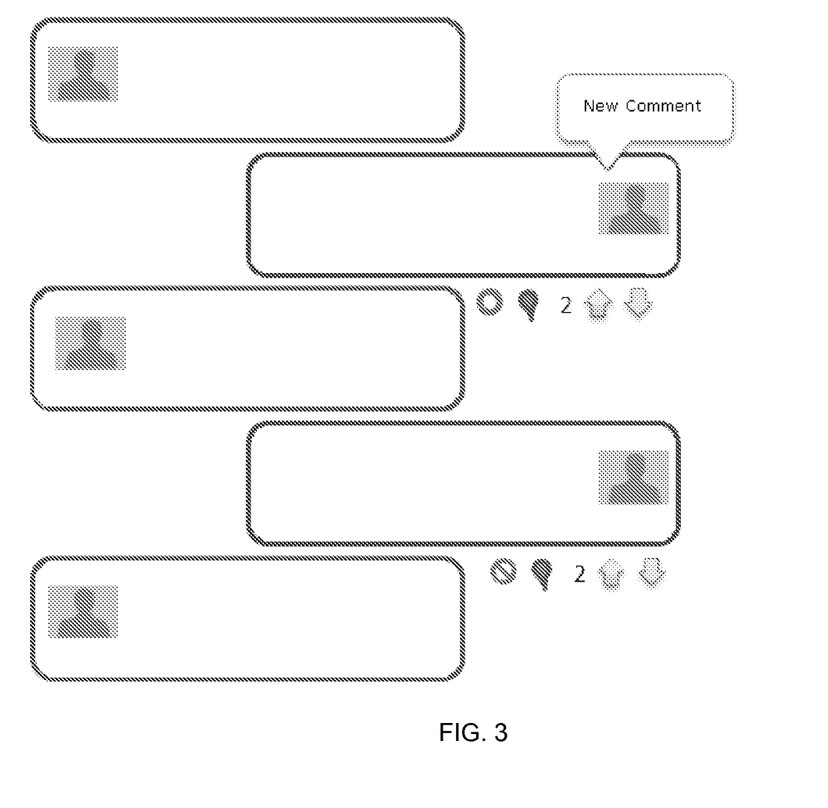
FIG. 3 illustrates an exemplary event detected by the system for universal messaging, in accordance with an embodiment.

FIG. 3 illustrates an exemplary event detected by the USMP 102, where the event detected is a receipt of a new comment from of the user's contacts in a social networking service.

Returning to FIG. 2, at step 204, an option associated with the event is selected by the USMP 102 based on information in the user profile. In an embodiment, the option selected by the USMP 102 may be an addition to the options already made available to the user by device manufacturers or by service providers 108. The option may also be a modification of and/or improvement to, already existing options. For example, when the USMP 102 detects that the user device is used to take a photographic picture of one or more persons, an option to remove a red-eye effect may be selected from a database of options maintained by the USMP 102. In another example, when the USMP 102 detects that the user device 104 is in receipt of SMS containing shortcuts (e.g., "lol," "tnx," "btw," etc.), an option to transform the shortcuts into complete words may be selected from the USMP 102 database.

Figure 4A:
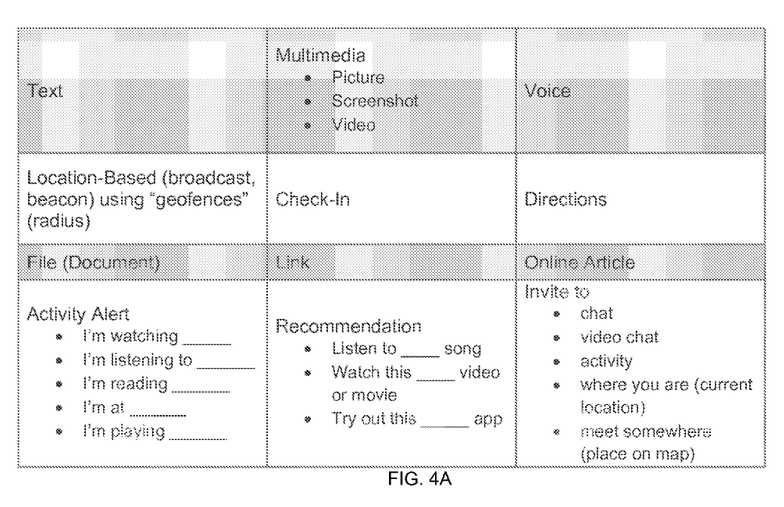
FIGS. 4A-4F illustrate exemplary options associated with detected events, in accordance with various embodiments.
Figure 4B:
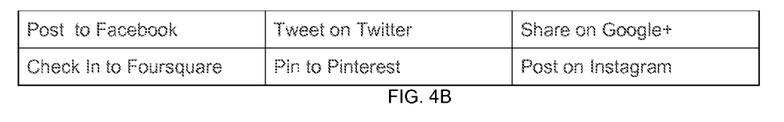
Figure 4C:
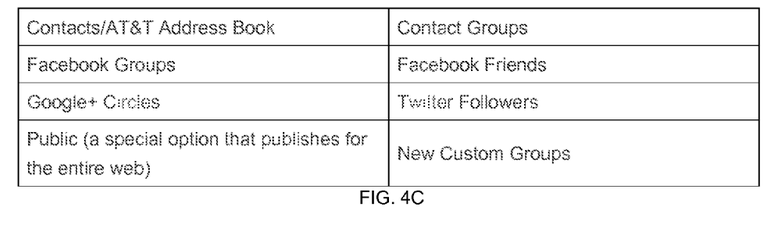
Figure 4D:
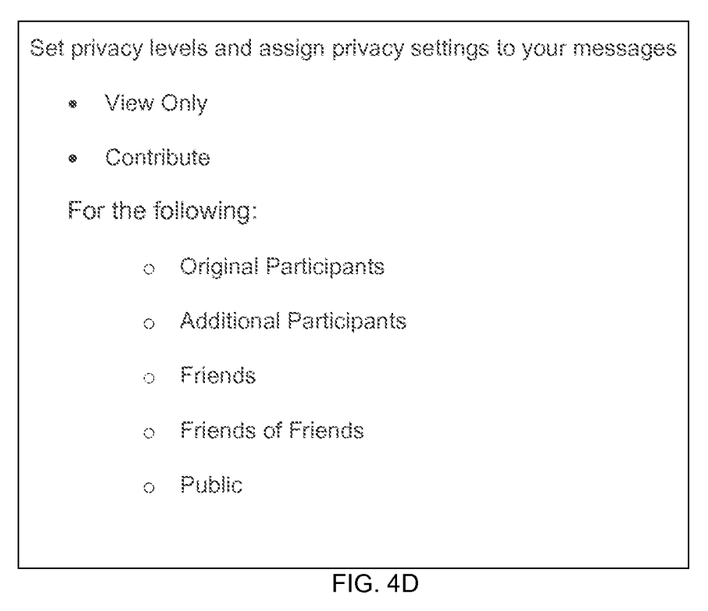
Figure 4E:
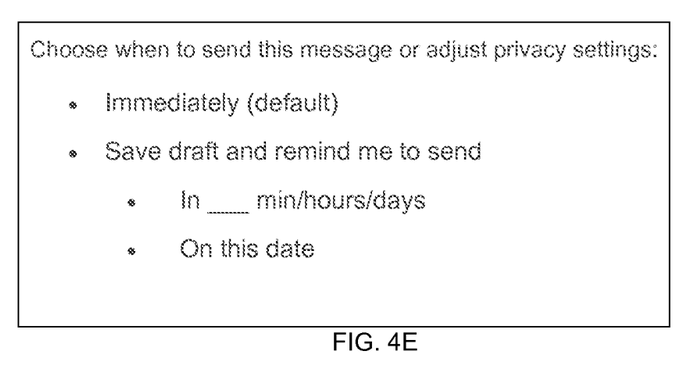
Figure 4F:
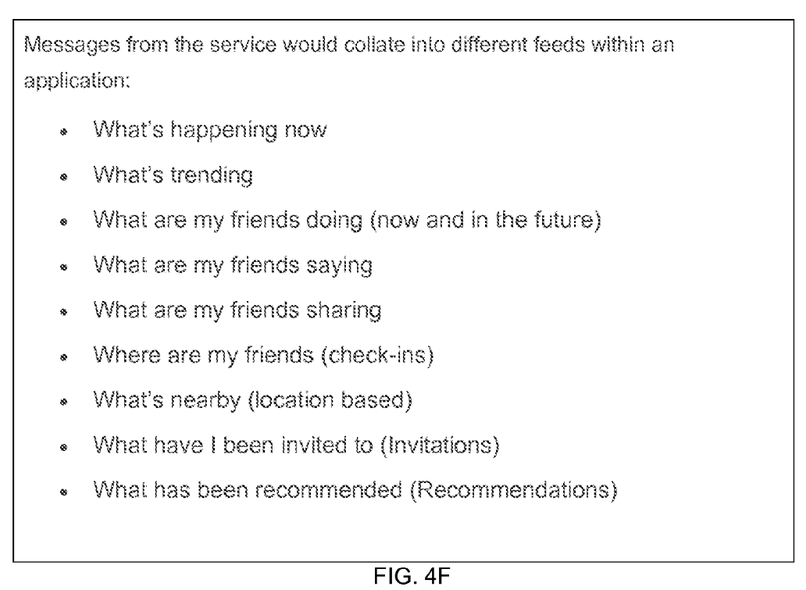
Figure 4G:
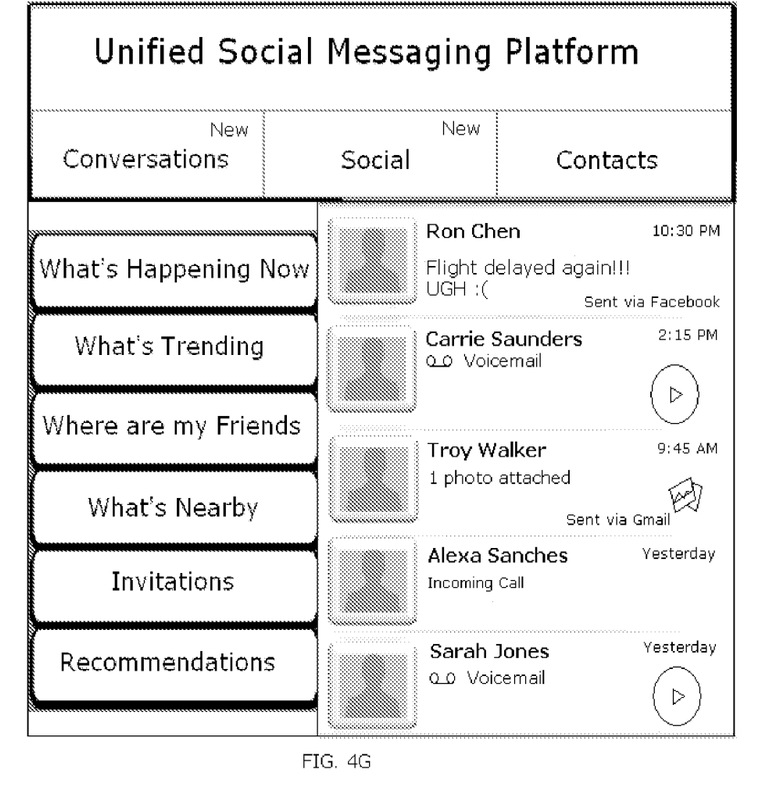
FIG. 4G illustrates exemplary unified access universal graphical user interface in accordance with various embodiments.
Figure 4H:
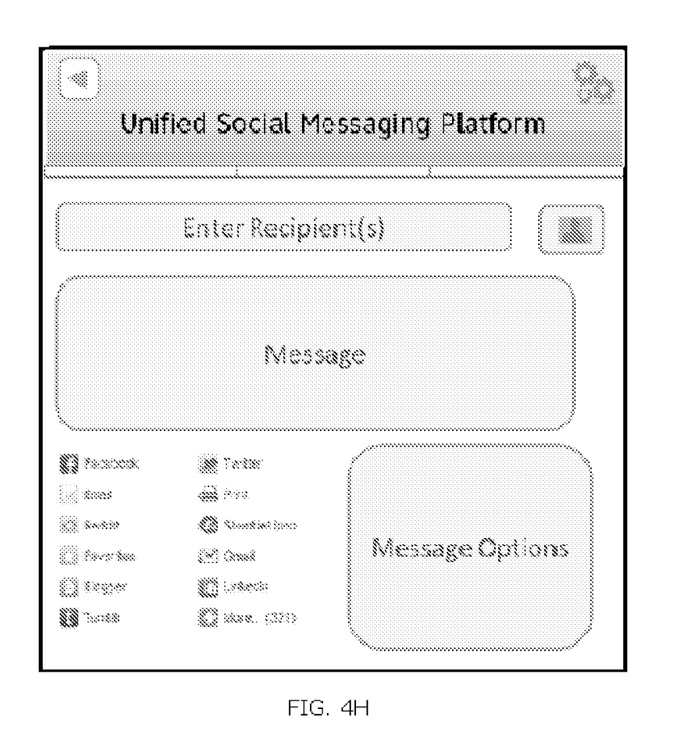
FIG. 4H illustrates exemplary default "Compose New Message" screen of the exemplary unified access universal graphical user interface.

FIGS. 4A-4G illustrate exemplary unified access universal graphical user interface displaying a plurality of detected events and exemplary options associated with detected events. For example, FIG. 4A, 4B, and 4F illustrate exemplary database tables containing a plurality of options that may be selected in response to detection of an event on a host device. FIG. 4C illustrates an exemplary database table that may include a unified list of contacts. FIG. 4D and 4E illustrate exemplary user interface screens displaying a plurality of option choices from which a user of a user device may choose. FIG. 4G illustrates exemplary initial display screen of a universal graphical user interface in accordance with an embodiment. FIG. 4H illustrates exemplary default "Compose New Message" screen of the exemplary unified access universal graphical user interface in which recipients can be selected, messages can be entered, one or more social network mediums can be designated, one or more message options outlined in the present disclosure can be selected.

In an embodiment, upon detecting the generation or forwarding of any transmission (email, SMS, MMS, Twit, chat, IM, etc.), the USMP 102 may provide the user of the user device 104 with content privacy options, as illustrated in FIGS. 4D-4E. Such a privacy option allows users to make their conversations and messages private or "opaque" to 3$^{rd}$ parties. In another embodiment, users may be provided with an option to make their content and messages viewable to the public or specific audiences for a designated amount of time. So upon expiration of a designated period of time, a selected transmission or content would be set to private, or the content would be removed from the accessible cloud file system/server.

In yet another embodiment, the USMP 102 may provide the user of the user device 104 with an option to recall transmitted content. Upon user's selection of content recall functionality, the USMP 102, which may track the content to its destination, invokes the recall in much the same way as the USMP activates a change in privacy settings.

It is to be understood that options associated with a detected event may be implemented by a policy hierarchy within your PSM-Net. Distribution of content may be handled by policies defined within user's PSM-Net as well. For example, users may want content to be "tweeted" to certain people at certain predetermined times based on subject and/or grouping. Additional functionality allowing for content to be copy-transmitted to other recipients via other routing options (e.g., email, IM, etc.) may also be available through the USMP 102, as illustrated in FIG. 4C.

In an embodiment, the USMP 102 may invoke one or more options dealing with corporate and other personal policies of the users and recipients of the content. That is, content could be propagated across PSM-Net domains so that recipients of the content would only receive it via an appropriate mechanism and at an appropriate time. For example, corporate emails are either securely delivered to clients, not delivered to clients or that clients simply receive a notice that a secure, proprietary or private message or content is waiting for them on another network delivery mechanism.

In yet another embodiment, upon detecting receipt of content in a certain format, the USMP 102 may provide the user of the user device 104 with an option to transparently convert content to other suitable formats. For example, upon detecting that the user device 104 has received a voice message, the option to convert the voice message into a text message or email may be selected by the USMP 102.

One skilled in the art will recognize that the list of exemplary options selected by the USMP 102 at step 204 of method of FIG. 2 is non-limiting and may include any additional and/or desired options.

Returning to FIG. 2, at step 206, the option selected from the user profile is provided by the USMP 102 to the user. In an advantageous embodiment, the option may be provided to the user as an additional option being displayed alongside the options already being offered by either manufacturer of the user device 104 or by one of the service providers 108 to which the user is subscribed through the user device (e.g., "delete/save/forward the picture," "save the picture as wallpaper," or "forward the SMS to one or more existing contacts").

In an embodiment, at step 206, the USMP 102 may launch a unified access universal graphical user interface for consolidated access of cross-application events and related contacts. The unified access universal graphical user interface disclosed herein can be actuated and interacted with using any conventional or known input device including but not limited to physical keyboard, touch screen display, motion sensor, microphone, mouse, other types of pointer devices and any additional input device. The unified access and management of cross-application features, events and contacts functionality can be provided locally on user devices 104 by the USMP 102 to be used to access applications (e.g., including mobile applications), accounts, websites, services, documents, files, media, or any other content such as those provided by a third party hosts. For example, the USMP 102 can include a multi-application contact-oriented engine accessible over the network 106 by user devices 104 to enable concurrent access and management of events detected on user devices 104.

In an advantageous embodiment, the disclosed unified access universal graphical user interface further enables a user to perform the most commonly accessed functions of each of multiple mobile applications without having to launch or interact with the entire application. This allows a user to have an integrated view of these functions across multiple applications and communications channels. This provides a user with a more efficient way to check the status, notifications, or inbox (or its equivalent) of multiple communication modes without having to launch and navigate through each of multiple messaging applications or communications channels.

The unified access universal graphical user interface for consolidated or simultaneous access of application events and associated contacts may also be provided and enabled on a per application/content basis based on the services provided by the service providers 108 via a contact-oriented messaging application. In one of the embodiment, the unified access universal graphical user interface may enable the user to propagate a single message, generated by the user, simultaneously to several destinations across multiple applications and communications channels. For example, the user, who wishes to post a note about his or her vacation, may elect an option to post a simultaneous note to all suitable services (e.g., Facebook®, Twitter®, a family circle of Google+®, etc.). Upon detection that such an option was selected, the user's note is translated by the USMP 102 into a corresponding appropriate format for each selected service and simultaneously propagated to the service providers 108.

In an embodiment, at step 206, the USMP 102 may invoke a unified access universal graphical user interface which incorporates already existing options and the option selected by the USMP 102 in response to the event. In another embodiment, the USMP 102 may modify a graphical user interface provided by the user device 104 to include the option selected by the USMP 102.

It is to be understood that, in order to be able to modify the graphical user interface provided by the user device 104, the USMP 102 may have to obtain a license from a manufacturer of a user device 104 to introduce such modifications. It is also to be understood that such modification may be made if the USMP 102 is in possession of an Application Programming Interface (API) licensed from a manufacturer of a user device 104 for such and related purposes. The same requirements may apply to the USMP 102 in relation to modifying a graphical user interface provided by service providers 108.

In an embodiment, the unified access universal graphical user interface may be contact-based and not application based to provide a more efficient way for the user to interact with a contact regardless of the contact's means of communication or preferred mode of messaging.

One skilled in the art will recognize that the method of FIG. 2 is non-limiting and that components of the presented system may be combined in any way in various embodiments and may include any additional and/or desired components and/or configurations.

The foregoing examples are to be understood as being in every respect illustrative but not restrictive.

Figure 5:
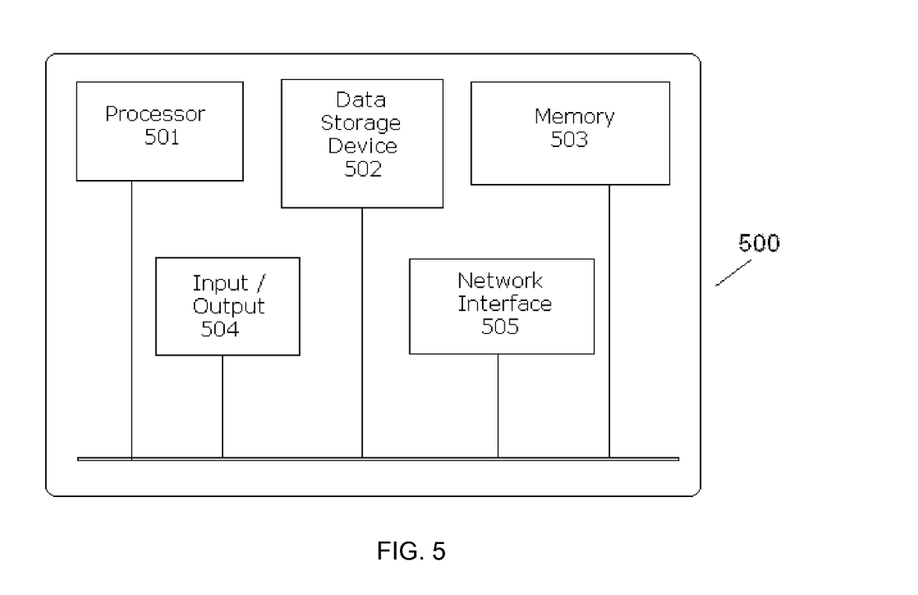
FIG. 5 illustratively depicts components of a computer that may be used to implement an exemplary system.

FIG. 5 is a high-level block diagram of an exemplary computer that may be used for implementing universal social messaging. Computer 500 comprises a processor 501 operatively coupled to a data storage device 502 and a memory 503. Processor 501 controls the overall operation of computer 500 by executing computer program instructions that define such operations. The computer program instructions may be stored in data storage device 502, or other computer readable medium, and loaded into memory 503 when execution of the computer program instructions is desired. Thus, the steps of FIG. 2 can be defined by the computer program instructions stored in memory 503 and/or data storage device 502 and controlled by processor 501 executing the computer program instructions. For example, the computer program instructions can be implemented as computer executable code programmed by one skilled in the art to perform an algorithm defined by the method steps of FIG. 2. Accordingly, by executing the computer program instructions, the processor 501 executes an algorithm defined by the method steps of FIG. 2. Computer 500 also includes one or more network interfaces 505 for communicating with other devices via a network. Computer 500 also includes one or more input/output devices 504 that enable user interaction with computer 500 (e.g., display, keyboard, mouse, speakers, buttons, etc.).

Processor 501 may include both general and special purpose microprocessors, and may be the sole processor or one of multiple processors of computer 500. Processor 501 may comprise one or more central processing units (CPUs), for example. Processor 501, data storage device 502, and/or memory 503 may include, be supplemented by, or incorporated in, one or more application-specific integrated circuits (ASICs) and/or one or more field programmable gate arrays (FPGAs).

Data storage device 502 and memory 503 each comprise a tangible non-transitory computer readable storage medium. Data storage device 502, and memory 503, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 504 may include peripherals, such as a printer, scanner, display screen, etc. For example, input/output devices 504 may include a display device such as a cathode ray tube (CRT), plasma or liquid crystal display (LCD) monitor for displaying information to the user, a keyboard, and a pointing device such as a mouse or a trackball by which the user can provide input to computer 500.

One skilled in the art will recognize that an implementation of an actual computer or computer system may have other structures and may contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only for illustrative purposes and that various modifications may be implemented by those skilled in the art without departing from the scope and spirit of the invention. Those skilled in the art could implement various other feature combinations without departing from the scope and spirit of the invention.

The invention claimed is:

1. A method for operating an electronic social messaging platform, the method comprising:
   detecting an event on a host device;
   selecting a plurality of service provider options associated with the event based on a policy hierarchy, a content recall setting, a content routing setting, and a content hierarchy setting, wherein each setting is set by a user via a universal graphical user interface;
   retrieving a device based option associated with the event; and transmitting the plurality of service provider options and the device based option to the host device.

2. The method of claim 1, further comprising:
registering a user of the host device with a plurality of electronic services.

3. The method of claim 2, wherein the plurality of electronic services comprises:
social networking portals;
messaging utility applications;
electronic data storage utilities; and
electronic data sharing utilities.

4. The method of claim 2, wherein registering the user comprises:
establishing a signal connection with each of the plurality of electronic services associated with the host device;
creating a user profile for the user of the host device for each of the plurality of electronic services; and
providing a plurality of settings associated with each of the plurality of electronic services, wherein the plurality of settings comprise: timing settings, privacy settings, data recall settings, data routing settings, data-type settings, data hierarchy settings, language settings, scheduling settings, and data security settings.

5. The method of claim 1, wherein detecting an event comprises one of:
detecting receipt of a text file from an electronic service;
detecting receipt of an audio file from an electronic service;
detecting a physical movement of the host device resulting from a physical gesture of a user;
detecting receipt of a video file from an electronic service; and
detecting accessing of a file on the host device.

6. The method of claim 5, wherein the accessing of a file on the host device comprises one of:
accessing an electronic contact record;
accessing an audio file;
accessing a video file;
accessing a text messaging utility; and
accessing a social media outlet.

7. The method of claim 1, wherein selecting a plurality of service provider options further comprises one of:
reproducing a plurality of options provided by a plurality of electronic services; and
retrieving a supplemental option associated with the event from memory and embedding the supplemental option within the plurality of options provided by the plurality of electronic services.

8. An electronic social messaging platform comprising:
a processor; and
a memory to store computer program instructions, the computer program instructions when executed on the processor cause the processor to perform operations comprising:
detecting an event on a host device;
selecting a plurality of service provider options associated with the event based on a policy hierarchy, a content recall setting, a content routing setting, and a content hierarchy setting, wherein each setting is set by a user via a universal graphical user interface;
retrieving a device based option associated with the event; and
transmitting the plurality of service provider options and the device based option to the host device.

9. The electronic social messaging platform of claim 8, the operations further comprising:
registering a user of the host device with a plurality of electronic services.

10. The electronic social messaging platform of claim 9, wherein the plurality of electronic services comprises:
social networking portals;
messaging utility applications;
electronic data storage utilities; and
electronic data sharing utilities.

11. The electronic social messaging platform of claim 9, wherein registering the user comprises:
establishing a signal connection with each of the plurality of electronic services associated with the host device;
creating a user profile for the user of the host device for each of the plurality of electronic services; and
providing a plurality of settings associated with each of the plurality of electronic services, wherein the plurality of settings comprise: timing settings, privacy settings, data recall settings, data routing settings, data-type settings, data hierarchy settings, language settings, scheduling settings, and data security settings.

12. The electronic social messaging platform of claim 8, wherein detecting an event comprises one of:
detecting receipt of a text file from an electronic service;
detecting receipt of an audio file from an electronic service;
detecting a physical movement of the host device resulting from a physical gesture of a user;
detecting receipt of a video file from an electronic service; and
detecting accessing of a file on the host device.

13. The electronic social messaging platform of claim 12, wherein the accessing of a file on the host device comprises one of:
accessing an electronic contact record;
accessing an audio file;
accessing a video file;
accessing a text messaging utility; and
accessing a social media outlet.

14. The electronic social messaging platform of claim 8, wherein selecting a plurality of service provider options further comprises one of:
reproducing a plurality of options provided by a plurality of electronic services; and
retrieving a supplemental option associated with the event from memory and embedding the supplemental option within the plurality of options provided by the plurality of electronic services.

15. A computer readable storage device storing computer program instructions for operating an electronic social messaging platform, which, when executed on a processor, cause the processor to perform operations comprising:
detecting an event on a host device;
selecting a plurality of service provider options associated with the event based on a policy hierarchy, a content recall setting, a content routing setting, and a content hierarchy setting, wherein each setting is set by a user via a universal graphical user interface;
retrieving a device based option associated with the event; and
transmitting the plurality of service provider options and the device based option to the host device.

16. The computer readable storage device of claim 15, the operations further comprising:
registering a user of the host device with a plurality of electronic services.

17. The computer readable storage device of claim 16, wherein the plurality of electronic services comprises:

social networking portals;
messaging utility applications;
electronic data storage utilities; and
electronic data sharing utilities.

18. The computer readable storage device of claim 16, wherein registering the user comprises:
establishing a signal connection with each of the plurality of electronic services associated with the host device;
creating a user profile for the user of the host device for each of the plurality of electronic services; and
providing a plurality of settings associated with each of the plurality of electronic services, wherein the plurality of settings comprise: timing settings, privacy settings, data recall settings, data routing settings, data-type settings, data hierarchy settings, language settings, scheduling settings, and data security settings.

19. The computer readable storage device of claim 15, wherein detecting an event comprises one of:
detecting receipt of a text file from an electronic service;
detecting receipt of an audio file from an electronic service;
detecting a physical movement of the host device resulting from a physical gesture of a user;
detecting receipt of a video file from an electronic service; and
detecting accessing of a file on the host device.

20. The computer readable storage device of claim 19, wherein the accessing of a file on the host device comprises one of:
accessing an electronic contact record;
accessing an audio file;
accessing a video file;
accessing a text messaging utility; and
accessing a social media outlet.

* * * * *